United States Patent [19]
Green

[11] Patent Number: 4,899,797
[45] Date of Patent: Feb. 13, 1990

[54] SCREEN RETAINER STRIP ASSEMBLY

[76] Inventor: Guerry E. Green, 684 Fox Pond Dr., Mt. Pleasant, S.C. 29464

[21] Appl. No.: 297,186

[22] Filed: Jan. 13, 1989

[51] Int. Cl.⁴ ............................................. A47H 13/00
[52] U.S. Cl. ..................................... 160/395; 160/380
[58] Field of Search ............... 160/395, 380, 327, 371; 24/462, 460, 459; 38/102.2

[56] References Cited

U.S. PATENT DOCUMENTS

| | | | |
|---|---|---|---|
| 1,350,027 | 8/1920 | Lane. | |
| 2,897,889 | 8/1959 | Kessler | 160/392 |
| 3,199,258 | 8/1965 | Tentoft et al. | 52/282 |
| 3,220,469 | 11/1965 | Oehmig | 160/380 |
| 4,084,360 | 4/1978 | Reckson | 52/63 |
| 4,233,790 | 11/1980 | Meadows | 52/222 |
| 4,261,144 | 4/1981 | Rizzo | 52/63 |
| 4,410,027 | 10/1983 | Lucous | 160/380 |
| 4,662,038 | 5/1987 | Walker | 24/460 |
| 4,665,670 | 5/1987 | van den Burg | 52/222 |
| 4,690,192 | 9/1987 | Stilling | 160/57 |
| 4,731,960 | 3/1988 | Sease | 52/36 |

FOREIGN PATENT DOCUMENTS 1165725  10/1969  United Kingdom ................ 160/395

*Primary Examiner*—Blair M. Johnson
*Attorney, Agent, or Firm*—Michael A. Mann

[57] ABSTRACT

A retainer strip assembly for securing screening and the like to a framing member comprises a base strip fastened to the framing member and having preferably two grooves parallel to the long dimension of the base strip, each groove for holding one spline with the marginal portion of the screen wound thereabout and separated by a channel defined by a left and a right wall and a floor, and a cap strip releasably secured to the base strip by downwardly depending catches hooking onto inwardly protruding lips formed on the left and right walls of the channel.

9 Claims, 1 Drawing Sheet

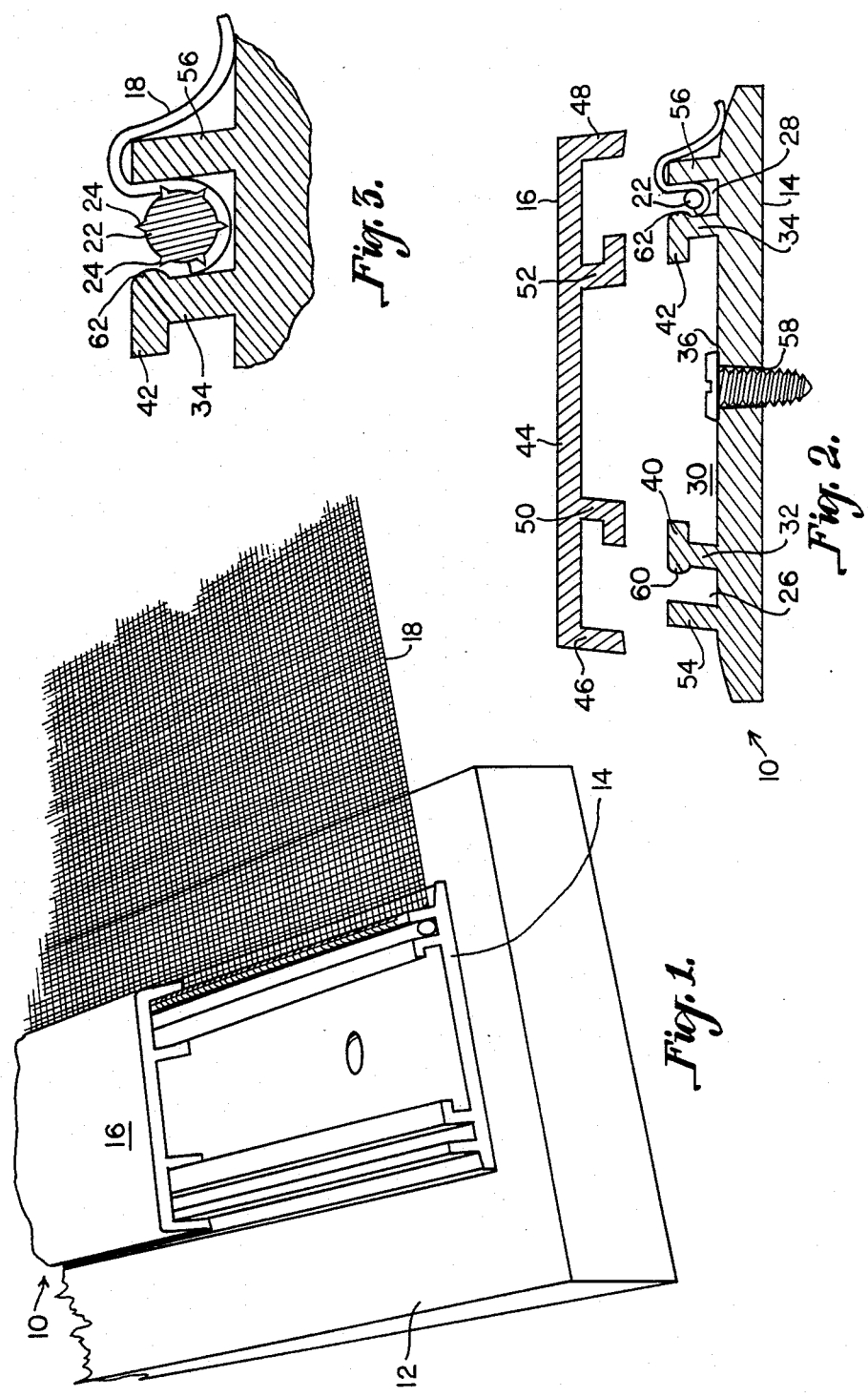

4,899,797

SCREEN RETAINER STRIP ASSEMBLY

BACKGROUND OF THE INVENTION

1. Field of the Invention

The present invention relates to retainer strips for screens and the like. More specifically, the present invention relates to low-profile, universal retainer strips for removably fastening screens and the like to framing such as is used for porches.

2. Discussion of Background and Prior Art

Screened porches increase the enjoyment of the out-of-doors in many parts of the country. The screening blocks the entry of insects and admits air to the area of the porch so enclosed. Typically, the porches are screened by erecting a simple wooden framing to enclose the porch in a series of panels and to which framing the screening material is nailed or tacked. The nails or tacks are covered with furring strips to give the structure a finished appearance.

Periodically, the screening must be replaced because of damage or degradation. Also the screening can become dirty so as to require cleaning which can not be done effectively with the screens in place and it is impractical to clean the screens by removing them completely. Removal of the screening involves prying off the furring strips and pulling the nails or tacks from the framing with the resulting damage to the framing. Furthermore, the screening may run over several panels so that a large area of screening may have to be replaced to effect a repair needed in only one panel.

In some areas of the country, such as along the sea coast, where screening is especially susceptible to damage, and where relatively frequent replacement of screening is necessary, elaborate framing with removable screened elements is available. This framing is usually made of aluminum and is relatively expensive to install. It also lacks the flexibility of wood framing and, to some, the aesthetic appeal of painted or stained wood.

A number of other devices exist to attach screening to wood. Many of these are asymmetric so that they must be carefully oriented before being fastened to the framing. Some require two installers for proper installation. Some such devices are available as a set of elements each of which is suited for a different part of a porch configuration: one element for outside corners, one for inside corners, one for intermediate frame members, and so forth. Some are difficult to install, are obtrusive or lack a finished appearance.

SUMMARY OF THE INVENTION

An object of the invention is provide a retaining strip assembly for fastening screens and the like to framing.

Another object of the present invention is to provide a retaining strip assembly for fastening screens and the like to framing in such a way that the screen can be removed for cleaning or replacement one panel at a time without damaging the framing or adjacent panels.

Another object of the invention is to provide a single retaining strip that can be used universally with framing, that is, with corner framing members and with intermediate framing members, symmetric left to right so that it has no preferred orientation.

A still further object of the present invention is to provide a retaining strip that can be installed by one person without assistance.

Yet a still further object of the invention is to provide a retaining strip that has a finished appearance so as not to detract from the appearance of the structure to which it is fastened.

To achieve the foregoing and other objects and in accordance with the purpose of the invention, as embodied and broadly described herein, the invention comprises a base strip fastened to a framing member and having at least one narrow groove for receiving and holding temporarily a spline with a screen wound thereabout, and a cap strip removably fastened onto the base strip to cover the spline and base strip and assist in securing the spline within the narrow groove.

The present invention has a low profile, being only slightly thicker than a spline and is preferably an extruded all-weather, resilient plastic in white or other desirable color for low maintenance. Alternatively, the base may be made of aluminum or other metal and only the cap made of plastic. The cap strip serves primarily to cover the spline and the base strip including the heads of nails or screws used to fasten the base strip to the framing member but also to help hold the spline in place. So embodied, the strip assembly does not detract from the appearance of the structure to which the screening is to be fastened. Cap strip removal is easily accomplished by inserting a screw driver or other narrow lever at any point along the interface between base strip and cap strip and prying the two apart. The cap once loosened will peel off to allow access to the screen for replacement.

Furthermore, the narrow grooves of the base strip hold one or two splines with the marginal portion of screening wound thereabout so that the installer can position and secure the screen temporarily and then fasten the cap strip without having to hold the spline in place while doing so. Use of the screen retainer strip assembly allows the user to replace only the screen panels that he or she wants to replace and without having to repaint framing and furring strips.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings:

FIG. 1 is a perspective view of the retainer strip assembly with a partially cut away section to show the relationship of the cap strip to base strip according to the present invention.

FIG. 2 is an exploded cross sectional view along lines 2—2 of FIG. 1 according to the present invention.

FIG. 3 is a detailed, end view of the spline and marginal portion of the screen.

DETAILED DESCRIPTION OF THE INVENTION

Referring now to the drawings, FIG. 1 shows the retainer strip assembly 10 secured to a framing member 12. Assembly 10 comprises a base strip 14 and a cap strip 16 both running parallel to the long dimension of framing member 12.

Retainer strip assembly 10 may be used to secure any type of flexible sheeting such as cloth, canvas, plastic or mesh screening to framing member 12. FIG. 1 shows a mesh screen 18 secured to frame member 12.

As shown in FIG. 2, showing a cross-sectional, exploded view of retainer strip assembly along lines 2—2 of FIG. 1, screen 18 is fastened to the one side of retainer strip assembly 10 where a marginal portion 20 of screen 18 is wound about a resilient, cylindrical spline 22 having a series of teeth 24 about its exterior surface (as best seen in FIG. 3). Spline 22 is received by a narrow groove 26. A second groove 28 can also receive a second spline when retainer strip assembly 10 is fastened to an intermediate framing member having screening on either side. Grooves 26 and 28 are sufficiently narrow so that a spline received therein is held temporarily; that is, grooves 26 and 28 can hold spline 22 with screen 18 wound thereabout and exerting a small amount of tension on spline 22 without spline 22 slipping out of groove 28.

Between groove 26 and 28 is a channel 30 defined by a left wall 32, a right wall 34 and a floor 36. Screws or nails can be driven through the floor 36 of channel 30 to hold base strip 14 to frame member 12. Preferably, holes 58 may be drilled into floor 36 at the time of fabrication to assist in the attachment of base 14 to frame member 12. A screw 38 is shown in FIG. 2. Alternatively, base strip 14 can be glued to frame member 12.

Left wall 34 and right wall 36 have inwardly protruding lips 40 and 42, respectively, and outwardly protruding bulges 60 and 62. Cap strip 16 both serves to cover base strip 14 and to hold spline 22 in place. Cap strip 16 has a top 44, a left side 46 and a right side 48 substantially covering base strip 14. Under top 44 are a left catch 50 and a right catch 52 positioned between left and right walls, 32, 34, respectively of base strip 14. So positioned, catches 50, 52 hook onto the protruding lips 40, 42 of left and right walls 32, 34, respectively.

In addition to holding cap strip 16 to base strip 14, catches 50, 52 bear outwardly against left and right walls 32, 34, respectively, and thereby against outwardly protruding bulges, 60 and 62, respectively, on the opposing sides of left and right walls 32, 34, which right bulge 62 pinches spline 22 in groove 28 and assists in holding screen 18 against substantial tension, as seen in FIG. 3.

The sides of cap strip 16 finish the side appearance of retainer strip assembly 10 and also fold screen 18 down around the outside of groove 28, adding further resistance against the dislodging of spline 22 and screen 18. A left outer wall 54 and right outer wall 56 of base strip 14 are slightly recessed to create slits between base strip 14 and the sides of cap strip 16 for insertion of a tool such as a screw driver to pry cap strip 16 from base strip 14 without the screw driver bearing directly against frame member 12.

Cap strip 16 and base strip 14 can both be made of a resilient plastic, each extruded in any appropriate color, or made of metal. When in place, the retainer strip assembly has a low, unobtrusive profile.

If desired, retainer strip assembly can be made with only one groove for use as a retainer strip assembly attached to end framing members.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chose and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A retainer strip assembly for fastening a marginal portion of a screen and the like to a frame member which assembly comprises:

a resilient longitudinal spline for winding said marginal portion of said screen thereabout, said spline having a generally circular cross-section;

a base strip having a top, a bottom a left outer wall and an opposing right outer wall, said bottom of said base strip fastened to said frame member, said base strip having at least one narrow groove parallel to the long dimension of said base strip, said groove holding temporarily said spline within said groove so that said spline does not readily pull out;

a cap strip having a top, a left side, an opposing right side and a means for holding said spline and said screen in said at least one groove, said cap strip covering said top and said sides of said base strip and releasably secured to said base strip, and said left and said right sides of said cap strip folding said screen around said left and said right outer walls, respectively, of said base strip to provide additional resistance to dislodging said spline and to cover said left and right outer walls of said base strip, said base strip having a channel adjacent said at least one groove, said channel having a floor through which nails or screws can be driven into said frame member for fastening said base strip so that no nails or screws are seen externally of said assembly.

2. The assembly of claim 1 wherein said base strip has two of said grooves and said channel is between said grooves defined by a left wall and a right wall separated by said floor.

3. The assembly of claim 2 wherein said left and said right walls each has an inwardly protruding lip and an opposing outwardly protruding bulge and said means for holding said spline and screen to said base strip comprises a left catch depending downwardly from said cap strip, said left catch located so as to releasably lock onto said protruding lip of said left wall of said channel;

a right catch depending downwardly from said cap strip, said right catch located so as to releasably lock onto said protruding lip of said right wall of said channel;

said left and right catches in bearing relationship with said protruding lips of said left and right walls, respectively, as said left and right catches lock onto said protruding lips so that said left and right walls with said bulges pinch said splines within said grooves.

4. The assembly of claim 3 wherein said cap strip is made of resilient plastic.

5. A retainer strip assembly for fastening a marginal portion of a screen and the like to a frame member which assembly comprises:

at least one resilient longitudinal spline for winding said marginal portion of said screen thereabout, said spline having a generally circular cross-section;

a base strip having a top, a bottom, a left outer wall and an opposing right outer wall, said bottom of said base strip fastened to said frame member, said base strip having two narrow grooves parallel to the long dimension of said base strip and open at said top of said base strip for receiving said spline, each of said grooves adapted for holding temporarily one of said splines within said groove so that said spline does not readily pull out, said base strip having a cut out portion between said grooves defining a channel between and parallel to said grooves, said channel having a floor, a left wall and a right wall, each of said walls having an inwardly protruding lip; and a cap strip having a top, a left side, an opposing right side and a means for holding said spline and said screen to said base strip, said cap strip covering said top and said sides of said base strip, and said left and said right sides of said cap strip folding said screen around said left and said right outer walls, respectively, of said base strip to provide resistance to dislodging said spline, and said top of said cap strip having left and right downwardly depending catches for positioning between said left and right walls of said channel so that said left catch hooks said protruding lip of said left wall and said right catch hooks said protruding lip of said right wall releasably securing said cap strip to said base strip, said left and said right catches bearing against said left and said right walls respectively so that said at least one spline is pinched within said grooves.

6. The assembly of claim 5 wherein said left and said right walls each has an inwardly protruding bulge opposing said outwardly protruding lip, said bulges holding said splines within said grooves.

7. The assembly of claim 5 wherein said said cap strip is made of resilient plastic.

8. The assembly of claim 6 wherein said assembly is secured to said frame member by nails or screws driven through said floor of said channel so that no nails or screws are seen externally of said assembly.

9. The assembly of claim 8 wherein holes for said nails or screws are drilled in said base strip at the time of manufacturing.

* * * * *